United States Patent Office
3,322,641
Patented May 30, 1967

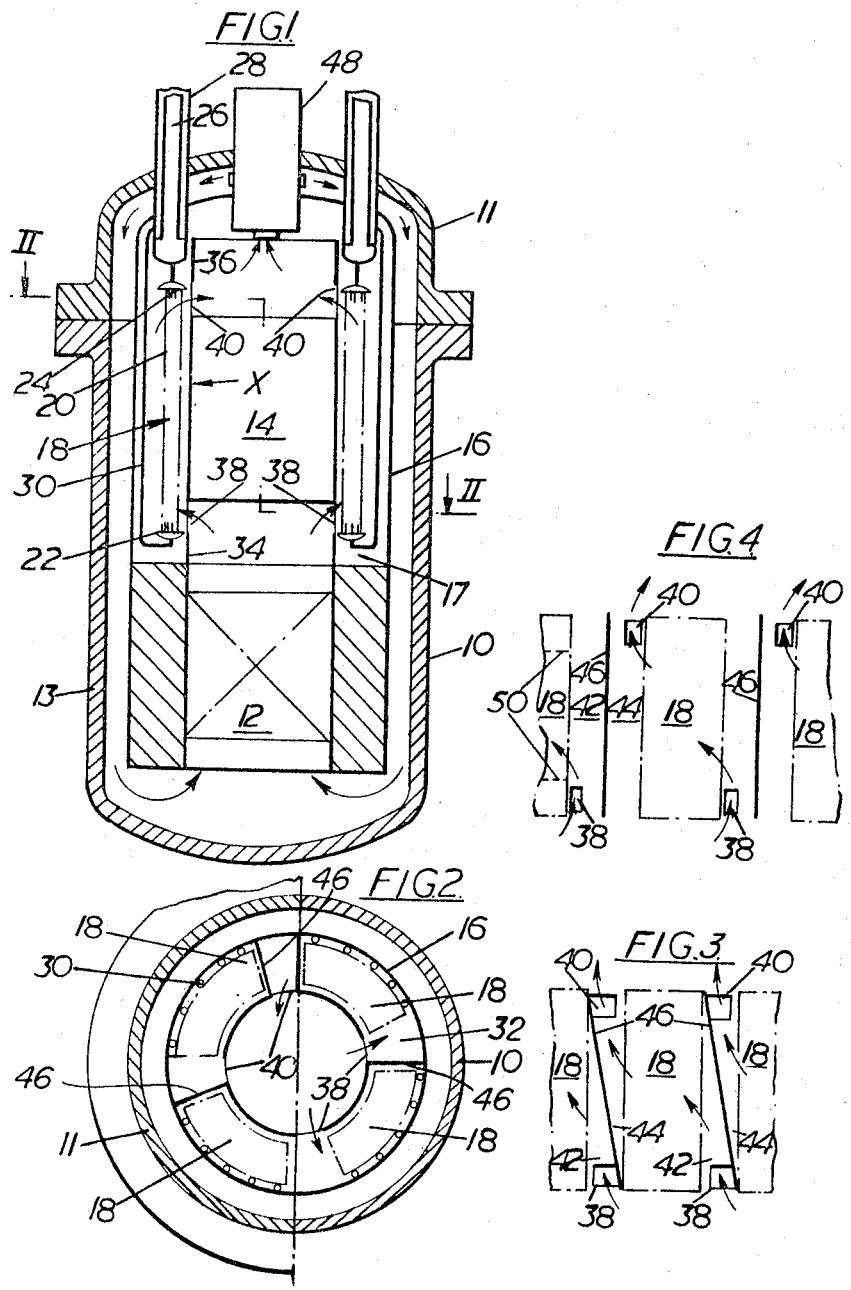

3,322,641
INTEGRATED NUCLEAR REACTOR-STEAM
GENERATOR
Malcolm Richard Williamson, Slough, England, and
Albert Geoffrey Wood, Montreal, Quebec, Canada, assignors to United Kingdom Atomic Energy Authority,
London, England
Filed June 29, 1965, Ser. No. 468,039
Claims priority, application Great Britain, June 29, 1964,
26,821/64
7 Claims. (Cl. 176—54)

This invention relates to vapour generators and it is to be understood that where, herein, the words "water" and "steam" are used, they are intended to denote any liquid and its vapour unless the context requires otherwise.

More specifically, the invention is concerned with so-called integrated nuclear reactor/steam generator systems in which the heating surface is housed in the same vessel as the reactor core so as to be heated by the primary coolant therefrom. Such systems have the advantage over systems in which the steam generator is outside the reactor vessel of compactness and saving of pipework and are, therefore, of particular interest in marine applications.

In the arrangement with which the invention is concerned, the steam generating tubes are preferably in the form of vertical modules terminating in inlet and outlet manifolds. If the manifolds are of hexagonal shape, the modules can be arranged so as to utilise the available space to very good advantage but the manifolds must be disposed so that they do not unduly obstruct the flow of the primary coolant. This can be ensured to some extent by staggering the manifolds in the direction of the length of the modules but even so it can be difficult to avoid an undue pressure drop and uneven distribution of the primary coolant and loss of effective heat transfer surface.

In accordance with the invention there is provided an integrated nuclear reactor/steam generator system in which the heating surface comprises steam generating tubes disposed in the upper part of the vessel in a chamber having a vertical axis, the tubes being substantially parallel to the axis of the chamber and primary coolant being directed to flow through the chamber, and in which the steam generating tubes are grouped into a number of compartments separated by partitions extending across the chamber, primary coolant inlet and outlet openings for each compartment being so arranged relatively to each other that primary coolant, on its passage through the bank, flows across the tubes.

In the preferred form of the invention, the partitions are arranged diagonally across passages between the banks, or in other words slope at an angle to the axis of the chamber when considered from perpendicularly to that axis, so that these taper away from the inlets and towards the outlets. This economises space and assists in ensuring good even distribution of the primary coolant over the tubes.

An integrated nuclear reactor/steam generator system in accordance with the invention will now be described, by way of example, with reference to the accompanying diagrammatic drawing in which:

FIGURE 1 is a sectional elevation;
FIGURE 2 is a section taken on the line II—II of FIGURE 1; and
FIGURE 3 is a developed view taken in the direction of the arrow X in FIGURE 1 showing the circulation system.
FIGURE 4 is a developed view corresponding to the view of FIGURE 3 but showing a modified arrangement of the partitions.

The system 10 shown comprises a vertical cylindrical vessel 13 having a removable lid 11 and housing at its lower end a shielded reactor core 12. Extending upwards from the core, there is an outer cylindrical trunk 16 closed at the upper end and containing an inner cylindrical trunk 14 closed at both ends. Control rods (not shown) for the core pass through the trunk 14 which contains other control gear.

An annular chamber 17 is defined by the two trunks 14 and 16 and houses a number of banks 18 of tube modules 20 each comprising a number of straight tubes terminating in inlet and outlet manifolds 22 and 24 at the lower and upper ends, respectively. The outlet manifolds 24 are connected to outlet headers 26 which pass through the top of the trunk 16 and the lid 11. The headers 26 are surrounded by co-axial jackets 28 forming inlet headers for the feed water. These inlet headers are connected to the inlet manifolds 22 of the modules 20 by downcomer tubes 30. If desired the downcomer tubes can be positioned as described in co-pending application No. 468,063 filed on June 29, 1965 by the instant joint inventor Williamson.

Four banks 18 are shown in the drawing but there may be more or less. The banks are separated by vertical radial spaces 32 bounded on the outside by the trunk 16 and on the inside by the trunk 14 and lower and upper extensions 34 and 36 thereof in which there are inlet and outlet ports 38 and 40, respectively, for the primary coolant from the core 12 disposed a little above and a little below the manifolds of the modules. The spaces 32 are separated into two passages 42 and 44 by partitions 46 as shown in FIGURES 3 and 4, these partitions extending radially between the trunks 14 and 16.

In the upper part of FIGURE 4 the partitions 46 are shown as dividing the spaces 32 into passages 42 and 44 of the same width along the height of the banks 18. The circulation of the primary coolant is from the core 12, through the ports 38, the banks 18 and the ports 40 to a circulating pump 48 and thence outside the trunk 16 back to the core. It will be seen that to pass from an inlet port 38 to an outlet port 40, the primary coolant must pass across a bank 18 transversely to the length of the tubes therein. Moreover, this coolant will tend on leaving the port 38 to fill the passage 42 before passing through the bank and there will, therefore, be very even distribution over the modules and the tubes therein; there will be substantially no disturbance by the manifolds at the ends of the modules as there would be if the primary coolant were caused to flow along the modules axially; the heat transfer will be improved compared with flow of the primary coolant along the length of the tubes; and there will be substantially no disturbance by any supports or spacers for the tubes which, if they are provided, will be arranged across the modules as indicated at 50 in FIGURE 3.

In FIGURE 3, the partitions 46 are shown disposed diagonally across the spaces 32 which is the preferred arrangement and is adopted in FIGURES 1 and 2. As will be seen, this reduces the overall width of the spaces and allows more heating surface to be provided in a given volume.

As already indicated, there can be as many banks 18 as are desired. The number will generally be determined to give the desired combination of number of steam generating sections, pressure drop in the primary coolant circuit and rate of heat transfer.

It will also be noted that the risk of boiling in the downcomers 30 which could seriously upset the circulation of the water is small because the downcomers are of small diameter.

What is claimed is:
1. An integrated nuclear reactor/steam generator system of the type wherein heating surfaces at which the steam is generated are housed in the same vessel as a core of the reactor and are heated by a primary coolant passed through the core, said system comprising chamber-defining means situated internally in the upper part of the vessel to form a chamber having a vertical axis, radially extending partitions dividing the chamber into several compartments, steam generating tube banks disposed respectively in the compartments and collectively constituting the heating surfaces at which the steam is generated, the tubes of said banks extending straight and substantially parallel to the chamber axis, and primary coolant inlet and outlet openings respectively adjacent opposite extremities of each compartment for directing primary coolant over the tubes in the compartments, the inlet and outlet openings of each compartment being offset relative to one another when viewed in the direction of the chamber axis to give the primary coolant a cross flow component over the steam generating tubes.

2. A system according to claim 1, wherein the primary coolant inlet and outlet openings are adjacent opposite ends of each compartment.

3. A system according to claim 2, wherein the partitions extend substantially parallel to the chamber axis.

4. A system according to claim 2, wherein the partitions extend at an angle to the direction of the chamber axis.

5. A system according to claim 1, wherein each steam generating tube bank is composed of a number of tube modules.

6. A system according to claim 5, wherein each module has a tube bundle which is substantially hexagonal in outline.

7. A system according to claim 5, wherein each module has inlet and outlet manifolds respectively at opposite ends of the tube bundle and the primary coolant inlet and outlet openings open laterally into each compartment at levels intermidate the inlet and outlet manifolds of the modules therein.

References Cited
UNITED STATES PATENTS 3,203,867    8/1965    Williams et al. _____ 176—65 X

FOREIGN PATENTS 1,297,494    5/1962    France.

REUBEN EPSTEIN, *Primary Examiner.*